Feb. 20, 1968  G. GOTTAUF  3,369,586

TIRE REPAIR PATCH

Filed Oct. 12, 1965  2 Sheets-Sheet 1

Feb. 20, 1968    G. GOTTAUF    3,369,586
TIRE REPAIR PATCH

Filed Oct. 12, 1965    2 Sheets-Sheet 2

United States Patent Office 3,369,586
Patented Feb. 20, 1968

3,369,586
TIRE REPAIR PATCH
Georg Gottauf, Munich, Germany, assignor to
Stahlgruber Otto Gruber & Co.
Filed Oct. 12, 1965, Ser. No. 495,037
Claims priority, application Germany, Oct. 13, 1964,
ST 22,807
15 Claims. (Cl. 152—367)

ABSTRACT OF THE DISCLOSURE

A tire repair patch includes a body made of either vulcanized or unvulcanized rubber with reinforcing layers therein in the form of strips angularly superimposed upon each other and containing a plurality of parallel cord threads. At least some of these cord threads are inverted or bent to point towards the centre of each strip.

---

Figure 1:
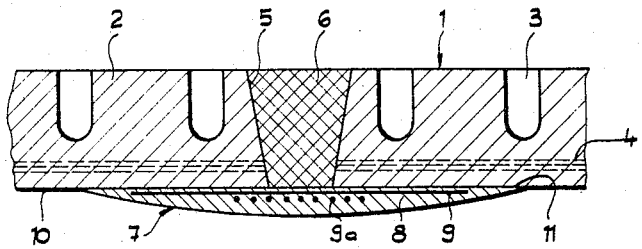

The repair of defects in vehicle tires for instance holes or rents or the like, with the exception of very tiny punctures, is usually performed by removing the rubber- and cord-layers in the vicinity of the hole by a conical cut. This cut is then filled with a mass of vulcanizable rubber and inside the tire a repair patch is provided, which is either vulcanized simultaneously with said mass of rubber by applying heat and pressure in special vulcanizing devices, or otherwise the repair patch, comprising a main body of vulcanized rubber and a thin adhesive connecting layer of unvulcanized vulcanizable rubber, is merely imposed on the defective area, pressed thereon, and united with the tire by way of cold vulcanization. It is self explanatory, that patches destined for the cold vulcanizing process may as well be vulcanized to the tire by applying heat and pressure in the aforementioned vulcanizing devices.

The strength of such patches regardless of their constructive variations basically result from the reinforcing layers embedded in rubber and usually consisting of angularly intersecting or crossing strips of cord fabric, or, more seldom of a woven fabric.

It is the purpose of such patches to mend and bridge the tire structure which has been destroyed, and to prevent the direct influence of the air pressure within the tire on the rubber mass filling the aforementioned cut. The patch must therefore offer a certain rigidity and because of this, an appropriate number of reinforcing layers must be provided in a crosswise or rosette-shaped arrangement, which number varies with the size of the tire. Usually the length of the reinforcing strips diminishes from the bottom of the patch to the top, i.e. from the part of the patch which is in contact with the tire to its free side. Patches containing ten or even more reinforcing layers are not unusual. The dominating demand for a sufficient strength is opposed by the desire to make the patches as light as possible, because every local enlargement in the cross-section of the tire, caused by such a patch, creates an unbalance which renders the balancing of the tire difficult, diminishes the elasticity of the tire, causes local heat accumulation when the tire is run, and renders the repair of possible further defects, close to a former defect thus repaired, most difficult.

One of the most feared aspects is the so-called "bulging," which appears whenever the pressure within the tire causes the part of the patch covering the actual defect to bulge into the aforementioned cut which is even possible if said cut contains a rubber filling. In the run of time this effect may even cause the rubber filling to work loose, which in turn leads to a blow-out of the patch itself. It has even been observed that the reinforcing strips of small patches have been forced out of the hole thus formed altogether.

Various proposals have been made to overcome this serious drawback, all of which aim to a strengthening of the patch especially the central part thereof in order to increase its rigidity. One of these proposals suggests to reinforce the center of the patch by a considerable number of reinforcing strips arranged in crosswise relationship to form a rosette-shaped center, in order to reduce the cross-sectional thickness of the patch. Such a patch is rather strong in its central part while the marginal area must not necessarily be as thick as may be expected by the number of reinforcing strips, because the strips which make up for the major part of the thickness are at this marginal area practically arranged side by side, and within one common plane. Other proposals suggest the use of an especially strong material in form of a square, rectangular or circular piece of a real woven fabric or even a wire-mesh in addition to the usual reinforcing strips of threads to provide the necessary strength in the center of the patch. Besides this the individual cord threads used in the reinforcing strips, have lately become stronger by using novel materials, especially synthetic fibers, so that now the strength values sometimes reach two or three times the value of the threads used in the body or carcass of the tire.

Since all these attempts could not reliably prevent the bulging, but only resulted in thick, bulky and expensive patches of a rather excessive diameter, if compared with the original defect, and since all these patches were found subject to the above mentioned inconveniences with respect to unbalance, heat accumulation and reduction of elasticity, applicants performed experiments, which proved that the bulging, contrary to the common opinion, does not directly depend on the strength of the threads used in the reinforcing layers, but results from the fact, that with the hitherto used methods the anchoring of the ends of the threads cannot be achieved to an extent ensuring the absolute straightness and parallelity of the threads.

The pressure within the tire has been found to be strong enough to loosen the threads from their anchorage.

In addition the threads because of their elastical embedding may move relative to each other, which in turn helps to loosen their anchoring within the embedding rubber, especially because the continuous relative movement between threads and embedding rubber leads to an untimely aging of the rubber which may go as far as to destroy the embedding of the threads by rubber regeneration.

To improve the connection between the rubber embedding and the cord fabric the latter is subjected to a preparation to make it more "rubber effective." In the course of manufacture of the patch, the cord fabric is cut into predetermined lengths, and the cut-off end faces of its threads are then not rubberized, so that the connection between rubber embedding and thread is especially poor at these points of great stress.

To avoid chafing of the inner tube, it is advantageous to use a patch which steadily decreases towards the margin to zero yet on the other hand, if the ends of the threads work loose, out of the above mentioned reasons, then the strength of the patch in this area will be reduced so much, that a tear may occur in the patch, normal to the inner face of the tire, which will pinch the inner tube causing the well known dangerous blow-outs.

It is therefore the main object of the invention to fix the ends of the threads used in the reinforcing strips and the layers, which are obtained by superimposing the individual strips angularly in such manner, that they cannot work loose. With this prerequisite the individual threads and consequently the reinforcing strips will retain their straight position after the patch has been connected with the tire. Only then the strength of the strips will actually result from the high tearing-resistance of the individual threads. This problem is solved according to the invention by employing the perception, that a thread, straightened out on a plane the end of the thread being held with a fixed pressure, will free itself from this hold much easier than another thread of equal strength, the end of which is led around an edge returned parallel to itself and held with the same force than the first mentioned thread.

Such an arrangement also overcomes the difficulty resulting from the cut ends of the threads being insufficiently rubberized, because the inversion of the ends of the threads in hairpin fashion renders the insufficiently rubberized ends either unimportant or at least makes it possible to arrange them outside the zones of maximum stress.

In addition another drawback, namely the appearance of tears in the marginal zones of the patch is overcome by the invention, because in said zones, which require an extraordinary elasticity the compound rubber cord fabric is substituted by a rubber compound, which has sufficient elasticity to withstand the respective alternating stresses appearing in the vicinity of the ends of the reinforcing layers, and thus avoids the separation effects at these spots.

The invention therefore consists in a tire repair patch comprising a patch body of vulcanized or unvulcanized rubber and reinforcing layers or inserts consisting of strips angularly superimposed upon each other and containing a plurality of parallel cord threads embedded in rubber the ends of at least some of the threads being inverted in hairpin fashion out of the plane of the strip to point towards the center of each strip.

Figure 2:
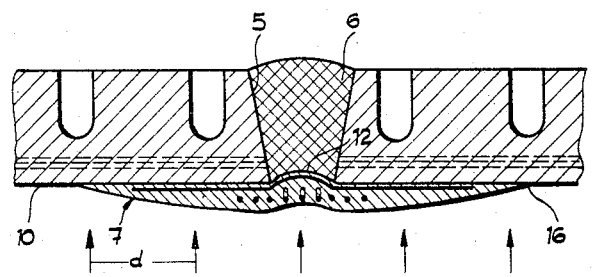
Figure 3:
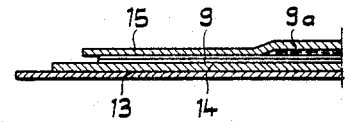
Figure 4:
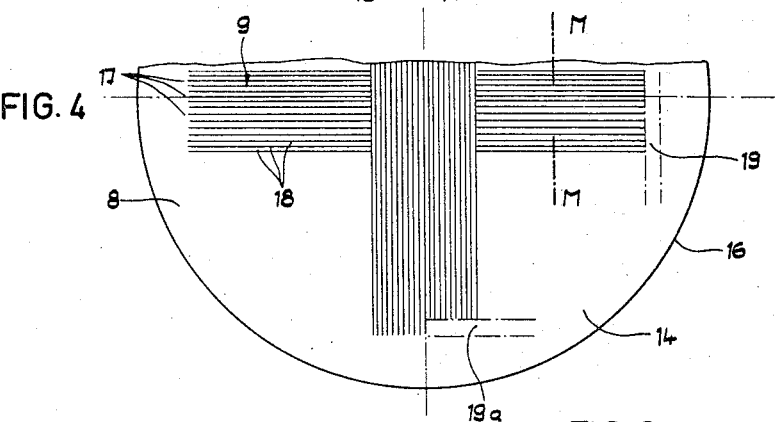
Figure 5:
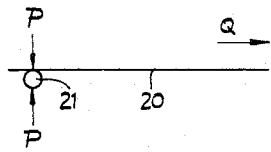
Figure 6:
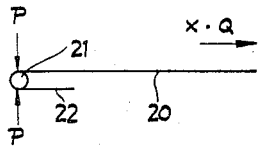
Figure 7:
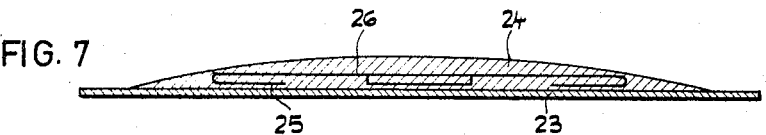
Figure 9:
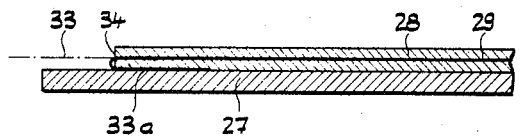
Figure 10:
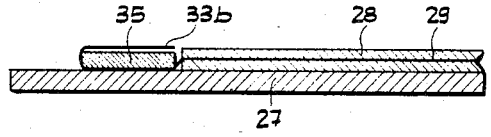
Figure 11:
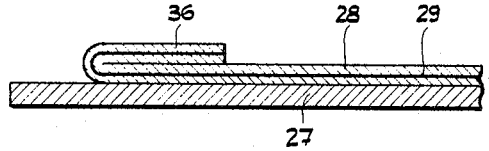
Figure 12:
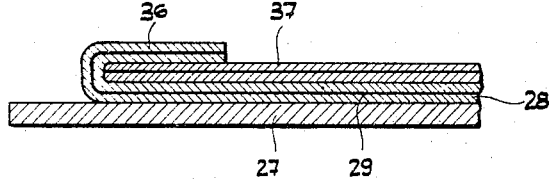
Figure 13:
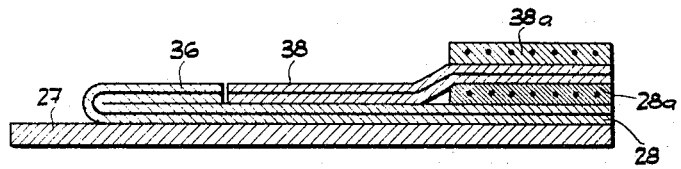

The prior art, the invention is based on, and some typical examples of inventive patches will appear more clearly from the following description especially if this is read with reference to the accompanying simplified and schematic drawings in which:

FIG. 1 is a cross-sectional view of a tire defect repaired with a patch, before the tire has been reused, FIG. 2 is a view corresponding with FIG. 1, but after use of the tire, FIG. 3 is a view of a patch as used in FIGS. 1 and 2, in half-section, FIG. 4 is a top view of the patch of FIGS. 1 and 2 with the covering layer removed, FIG. 5 shows the anchoring of the end of a thread in the known manner, FIG. 6 shows the anchoring of the thread in the inventive manner, FIG. 7 is a cross-sectional view of a patch according to the invention, FIGS. 8 to 12 are different views of patches according to the invention partly in section and in a greatly enlarged scale, FIG. 13 shows an arrangement comparable with that of FIG. 11 but with an additional reinforcing core consisting of two layers crossing each other.

In FIG. 1 reference 1 presents the tread portion of a tire with grooves 3 separating the treads 2. A defect interrupting the formation of the tire body or carcass 4 has priorly been repaired by cutting off the rubber in the immediate vicinity of the defect thus obtaining a cut or hole 5 which was then filled or packed with a rubber compound corresponding with that of the tread portion, which packing after vulcanization closes the defect by forming a plug 6. At the interior of the tire the defective area is covered by a patch, generally indicated at 7, which reinforces and bridges the interrupted tire composition or carcass 4, the patch consisting of a main body 8 of vulcanized rubber and two reinforcing layers 9 and 9a, which in this example consist of two strips superimposed normal to each other. The usual adhesive connecting layer between the inner face 10 of the tire and the respective bottom disk or connecting face 11 of the patch is not shown.

Alternatively the patch may consist of unvulcanized rubber the reinforcing layers being also unvulcanized, in which case vulcanization of the patch occurs simultaneously with the vulcanization of the rubber filling the cut or hole 5 in a known manner and using known equipment.

The patch 7 according to FIGS. 1 and 2 is for the purpose of simplification shown with a reinforcing core comprising only two reinforcing layers 9 and 9a. Yet a defect of the size illustrated in FIG. 1 would actually necessitate a patch many times as thick as illustrated and with a far greater diameter, and it would contain approximately from 6 to 10 reinforcing layers.

FIG. 2 illustrates the phenomenon known as bulging which appears when the tire has been put into operation again and after the defective area is subjected to the inside pressure represented by arrows d. That part of the patch, which covers the area of the cut filled out by the plug 6 and which corresponds with the centre of the patch, if the defect has been properly repaired, will be pressed into the cut in spite of plug 6 and this may even lead to the loosening of plug 6, which together with one or more reinforcing layers may then be forced through hole 5, which in this instance would be opened.

A patch 7 of the kind schematically illustrated in FIGS. 1 and 2 is composed during its manufacture out of consecutive layers in the following manner. A disk 13 of unvulcanized vulcanizable rubber, which in the finished patch represents the adhesive connecting layer, is covered by a bottom disk 14 of vulcanized rubber, which corresponds with the overall dimension of the patch. Interposed between said bottom disk 14 and a covering disk 15 also of vulcanized rubber are the reinforcing layers, which by way of their angularly superimposed arrangement represent the reinforcing core. The reinforcing strips usually consist of cord fabric, i.e. a plurality of parallel threads of cotton, nylon or other synthetic material embedded in rubber. The laminary structure shown in FIG. 3 is finally united and moulded into a patch under the influence of heat and pressure the patch thereby receiving an embossed cross-section. The above mentioned method is of course only true, if a so-called finished patch is produced. A rough or heating patch is composed in a similar manner with the exception that the various layers will be vulcanized and united with one another as well as with the tire after the patch has been placed into the tire and is subjected to heat and pressure by means of a vulcanizing apparatus.

FIG. 4 shows a finished patch in top view with the covering layer 15 of FIG. 3 removed. In this figure the left half illustrates a patch in the state corresponding with FIG. 1, i.e. shortly after the tire has been repaired but before it has been put back to use, while the right half illustrates the condition after the tire has been used for some time, i.e. in a state corresponding with FIG. 2. It can be observed, that even if the patch has been subjected to bulging the outer rim 16 limiting the rubber bottom disk united with the inner face 10 of the tire by vulcanization (FIG. 2) has not moved providing the patch has been properly applied. In other words, the bottom disk usually withstands all stresses and remains in its original position, while, however, the anchorage of the ends 17 of the individual threads 18, the reinforcing layers consist of, are mostly not equal to the stresses caused by the pressure within the tire.

This means, contrary to the usual opinion, that the position of the threads illustrated in FIG. 2 does not result from an excessive expansion which may be overruled by raising the specific strength of the individual threads, but that this symptom is caused by the threads being forced out of their anchorage. This occurs primarily and mainly in the vicinity of the ends of the threads and results in a shortening of the overall length of the projection of the threads on a horizontal plane, as shown at 19 and 19a, where the broken lines illustrate the difference between the ends of the threads before and after the patch has been put into operation.

In FIG. 5 an individual thread 20 is shown the end of which is forced as indicated by arrows P against a support 21 with a predetermined force, and urged out of this anchorage by a force represented by arrow Q. These conditions also appear in practical use, since the pressure within the tire represented by the arrows in FIG. 2 is active on the patch surface and creates a counterforce between tire and patch, which are forces corresponding with the above mentioned ones symbolized by arrows P, while at a spot where the counterforce of the tire is missing, i.e. the actual defective area the inner pressure creates a force with respect to the thread, which corresponds with the one represented by arrow Q. If on the other hand, as illustrated in FIG. 6, the end 22 of the thread is led around the edge of the support 21 inverted backwards parallel to itself, in hairpin fashion, and is also forced against the support 21 by forces P then the force $x \cdot Q$ necessary to pull the thread 20 out of its anchorage will amount to many times the original force Q.

A patch realizing this conception is shown in FIG. 7 in a cross-sectional, schematical and simplified manner. It comprises as commonly known a thin connecting layer 23 of unvulcanized vulcanizable rubber, and a main body 24, consisting of several layers vulcanized together. The reinforcing layers, consisting of angularly superimposed strips of parallel cord threads embedded in rubber are in this instance and according to the invention arranged in such manner, that the ends 25 of the cord threads 26 are inverted.

The practical realization of the inventive idea offers many possibilities. Six examples which by no means represent all of the designs and constructions in which the invention may be carried out, are illustrated in an enlarged scale in FIGS. 8–12. In all of these figures reference 27 represents a bottom disk corresponding in its configuration with the shape of the patch and consisting of vulcanized rubber in case of a finished patch or of unvulcanized rubber in case of a rough or heating patch. The disk 27 therefore corresponds with disk 14 as shown in FIG. 3. A reinforcing layer is indicated at 28, while reference 29 represents the cord threads embedded therein.

Figure 8:
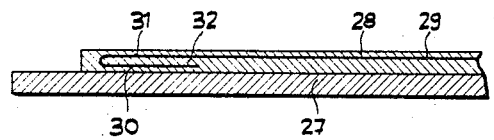

In the example according to FIG. 8 the invention is realized by the inverted end 30 of each cord thread being embedded in the rubber of the reinforcing layer 28. The embedding has been performed in such manner, that a certain amount of rubber 32 separates the inverted end 30 of the thread from its parallel branch 31. This rubber separation 32 functionally corresponds with the support 21 of FIG. 6. The reinforcing layers 28 may therefore be thus prefabricated and supplied to the party finally producing the patch by superimposing and moulding the different layers.

According to the example of FIG. 9, however, the reinforcing layer 28 is as well supplied in a prefashioned form, i.e. precut to its final length, yet in this case contrary to the aforementioned proposal a free end of each thread, indicated in broken lines at 33, surpasses the rubber embedding which end is afterwards inverted around the edge 34 of the rubber embedding either towards the top or as shown towards the bottom 33a of the reinforcing layer.

A comparable variation is shown in FIG. 10, where, however, the reinforcing layer 28 is shorter than that of FIG. 9 the surpassing ends 33b of the threads being correspondingly longer. The end 33b of each thread may then be inverted around a separate separation-layer 35, apart from the reinforcing layer 28 and consisting for example of rubber or a strip of cord fabric. This separation-layer 35 may in case of a round patch be formed as an annular ring covering the ends of all the threads 33b of all reinforcing layers 28.

For the better ease of handling the thread ends, in case of the arrangements according to FIGS. 9 and 10, these ends may be connected with each other by a few weft threads or by other means for instance by being bonded to a piece or strip of paper.

FIG. 11 illustrates a very simple and practical realization of the inventive idea according to which the ends 36 of the preferably rather thin reinforcing layers are inverted all together before the covering rubber disk, corresponding with disk 15 of FIG. 3 is imposed. This variation because of the inversion of the whole end zone of each reinforcing strip also offers a desirably enlarged surface which will be connected with the outermost margin of the patch.

Comparable with the example according to FIG. 11 is the one illustrated in FIG. 12, which only differs from the first one in so far as the end zone 36 of reinforcing strip 28 is not just inverted, but leads around the edge of an additional reinforcing strip 37 superimposed on strip 28.

The reinforcing effect of the reinforcing layers and therefore the utilization of the thread-strength can be improved, as extensive experiments have shown, by way of the inventive anchorage of the thread ends to such an extent, that the number of reinforcing layers may be considerably reduced, which of course is a striking advantage, because of the above mentioned reasons (reduced weight, minor unbalance, less heat accumulation, cheaper production). In a tire run on a testing machine a ten-ply patch of normal construction (i.e. a patch with ten reinforcing layers) was seriously damaged after the tire had been run between 3,000 and 5,000 kilometers whereby almost all the ends of the threads had been torn from their anchorage, while a six-ply patch of the inventive type did not show any such symptoms. After the running test the patches were cut through generally following the line M—M in FIG. 4, the resulting cross-sections were examined under the microscope and it was found that with the known patches the threads lay in tubelike channels surrounding them with clearance, while an inventive patch, the compound rubber cord-fabric was by no means disturbed.

Multiply or multilayer patches are commonly produced by covering two reinforcing layers crossing each other by a further cross of reinforcing layers, the strips of which conform with the ones of the lower layers, although they are usually reduced in their length and sometimes width with respect to the lower layers. In this case it may frequently be sufficient to only invert the ends of the threads in the layers next to the bottom disk 27 of the patch as illustrated in FIGURES 12 and 13. According to FIGURE 12 the reinforcing cross next to the bottom disk 27 consisting of reinforcing layers 28 and 28a is designed in accordance with FIGURE 11, while a second reinforcing cross covering the first one, and consisting of layers or strips 38 and 38a, is applied in the known manner, i.e. without inverted ends similar to layer 37 in FIG. 12 but with the difference, that in the latter figure the end of the layer 37 is covered by the inverted end 36 of layer 28, while according to FIG. 13 the end of the layers 38 abuts the inverted end 36 of layer 28.

Having thus fully disclosed my invention, what I claim is:

1. A tire repair patch comprising a patch body of rubber and reinforcing layers consisting of strips angularly superimposed upon each other and containing a plurality of parallel cord threads embedded in rubber the ends of at least some of the threads being inverted along a line across the longitudinal direction of said cord threads and out of the plane of the strip to point towards the centre of each strip, and weft threads connecting said cord threads.

2. A tire repair patch comprising a patch body of rubber and reinforcing layers consisting of strips angularly superimposed upon each other and containing a plurality of parallel cord threads embedded in rubber the embedded ends of which threads are inverted along a line across the longitudinal direction of said cord threads and out of the plane of the strip to point towards the centre of each strip, and weft threads connecting said cord threads.

3. A tire repair patch comprising a patch body of rubber and reinforcing layers consisting of strips angularly superimposed upon each other and containing a plurality of parallel cord threads embedded in rubber the ends of which cord threads are inverted along a line across the longitudinal direction of said cord threads and out of the plane of the strip around an additional rubber separation to point towards the centre of said strips, and weft threads connecting said cord threads.

4. A tire repair patch comprising a patch body of rubber and reinforcing layers consisting of strips angularly superimposed upon each other and containing a plurality of parallel cord threads embedded in rubber the ends of which cord threads surpassing the margins of the rubber embedding and being inverted to point towards the centre of the strips.

5. A tire repair patch comprising a patch body of rubber and reinforcing layers consisting of strips angularly superimposed upon each other and containing a plurality of parallel cord threads embedded in rubber the ends of which cord threads surpass the margins of the rubber embedding and are inverted to point towards the centre of the strips around an additional separation layer.

6. A tire repair patch comprising a patch body of rubber and reinforcing layers consisting of strips angularly superimposed upon each other and containing a plurality of parallel cord threads embedded in rubber the ends of which cord threads surpass the margins of the rubber embedding and are inverted to point towards the centre of the strips around an additional separation layer.

7. A tire repair patch comprising a patch body of rubber and reinforcing layers consisting of strips angularly superimposed upon each other and containing a plurality of parallel cord threads embedded in rubber the ends of which cord threads surpass the margins of the rubber embedding and are inverted to point towards the centre of the strips around an additional separation layer consisting of an annular ring surrounding the margins of all rubber embeddings of the superimposed reinforcing layers.

8. A tire repair patch comprising a patch body of rubber and reinforcing layers consisting of strips angularly superimposed upon each other and containing a plurality of parallel cord threads embedded in rubber the ends of which cord threads surpass the margins of the rubber embedding and weft threads connecting said cord threads with each other before said cord threads are inverted to point towards the centre of the strip.

9. A tire repair patch comprising a patch body of rubber and reinforcing layers consisting of strips angularly superimposed upon each other and containing a plurality of parallel cord threads embedded in rubber from end to end, the ends of said reinforcing layers with the embedded threads being inverted along a line across the longitudinal direction of said cord threads and out of the plane of the strip to point towards the centre of the layers, and weft threads connecting said cord threads.

10. A tire repair patch comprising a patch body of rubber and reinforcing layers consisting of strips angularly superimposed upon each other these reinforcing layers being arranged on top of a bottom disk in such manner, that at least two layers form a reinforcing cross of which more than one is provided in the patch whereby the layers forming a cross close to said bottom disk are at least partly covered by the adjacent cross, which is formed by layers extending longitudinally in the same direction as the layers closer to said bottom disk the ends of the reinforcing layers being inverted along a line across the longitudinal direction of said cord threads and out of the plane of the strip to point toward their centre, and weft threads connecting said card threads.

11. A tire repair patch comprising a patch body of rubber and reinforcing layers consisting of strips angularly superimposed upon each other these reinforcing layers being arranged on top of a bottom disk in such manner, that at least two layers form a reinforcing cross of which more than one is provided in the patch whereby the layers forming a cross close to said bottom disk are at least partly covered by the adjacent cross, which is formed by layers extending longitudinally in the same direction as the layers closer to said disk, the ends of the reinforcing layers forming a cross next to the bottom disk being inverted along a line across the longitudinal direction of said cord threads and out of the plane of the strip to point towards the centre thereof, and weft threads connecting said cord threads.

12. A tire repair patch comprising a patch body of rubber and reinforcing layers consisting of strips angularly superimposed upon each other, these reinforcing layers being arranged on top of a bottom disk in such manner, that at least two layers form a reinforcing cross of which more than one is provided in the patch, whereby the layers forming a cross close to said bottom disk are at least partly covered by the adjacent cross, which is formed by layers extending longitudinally in the same direction as the layers closer to said bottom disk the ends of the reinforcing layers forming a cross next to the bottom disk being inverted along a line across the longitudinal direction of said cord threads and out of the plane of the strip to point towards the centre of said cross around the straight ends of the adjacent layers forming a cross covering said first mentioned cross, and weft threads connecting said cord threads.

13. A tire repair patch comprising a patch body of rubber and reinforcing layers consisting of strips angularly superimposed upon each other and containing a plurality of parallel cord threads embedded in rubber the ends of the cord threads of some of the strips being inverted along a line across the longitudinal direction of said cord threads and out of the plane of the strip to point towards the centre of said strips while the ends of the cord threads of the rest of the strips remain in a straight position, and weft threads connecting said cord threads.

14. A tire repair patch comprising a patch body of rubber and reinforcing layers consisting of strips angularly superimposed upon each other and containing a plurality of parallel cord threads embedded in rubber the ends of which cord threads surpass the margins of the rubber embedding and a strip of paper connecting said cord threads with each other before said cord threads are inverted to point toward the centre of the strip.

15. A tire repair patch as set forth in claim 1 wherein said rubber is uninverted, and the inverted portions of the threads being inverted out of the plane of the remaining portions of the threads.

References Cited

UNITED STATES PATENTS

| | | | |
|---|---|---|---|
| 2,982,328 | 5/1961 | Emanueli et al. | 152—361 |
| 3,004,580 | 10/1961 | Chambers et al. | 152—367 |
| 3,267,981 | 8/1966 | Bennies | 152—367 |
| 3,299,936 | 1/1967 | Van Den Berg | 152—367 |

ARTHUR L. LA POINT, *Primary Examiner.*

C. W. HAEFELE, Y. P. SCHAEVITZ,
*Assistant Examiners.*